United States Patent [19]
Nemoto

[11] 3,919,606
[45] Nov. 11, 1975

[54] TRANSISTOR DRIVING CIRCUIT FOR MOVABLE ELEMENT

[75] Inventor: Koji Nemoto, Tama, Japan

[73] Assignee: Kabushiki Kaisha Seikosha, Japan

[22] Filed: Mar. 5, 1974

[21] Appl. No.: 448,186

[30] Foreign Application Priority Data
Mar. 10, 1973  Japan.................. 48-27595

[52] U.S. Cl. ............... 318/128; 318/132; 318/133; 318/138
[51] Int. Cl.² ................................ H02K 33/00
[58] Field of Search.......... 318/41, 69, 125–130, 318/132–134, 138

[56] References Cited
UNITED STATES PATENTS

| | | | |
|---|---|---|---|
| 3,015,054 | 12/1961 | Thoma | 318/130 |
| 3,302,083 | 1/1967 | Tanaka et al. | 318/138 |
| 3,524,117 | 8/1970 | Reich | 318/132 X |
| 3,699,415 | 10/1972 | Inoue et al. | 318/128 |
| 3,711,754 | 1/1973 | Nemoto | 318/126 |

*Primary Examiner*—Gerald Goldberg
*Attorney, Agent, or Firm*—Robert E. Burns; Emmanuel J. Lobato; Bruce L. Adams

[57] ABSTRACT

In a device wherein a movable element, such as a rotor or a vibrator, formed with magnetic poles, is driven by a transistor circuit with a detecting coil and a driving coil connected thereto, a highly stable driving circuit for the movable element wherein a charging-and-discharging circuits including a directive amplitude limiter and a capacitor is provided on the input side of the transistor circuit.

8 Claims, 13 Drawing Figures

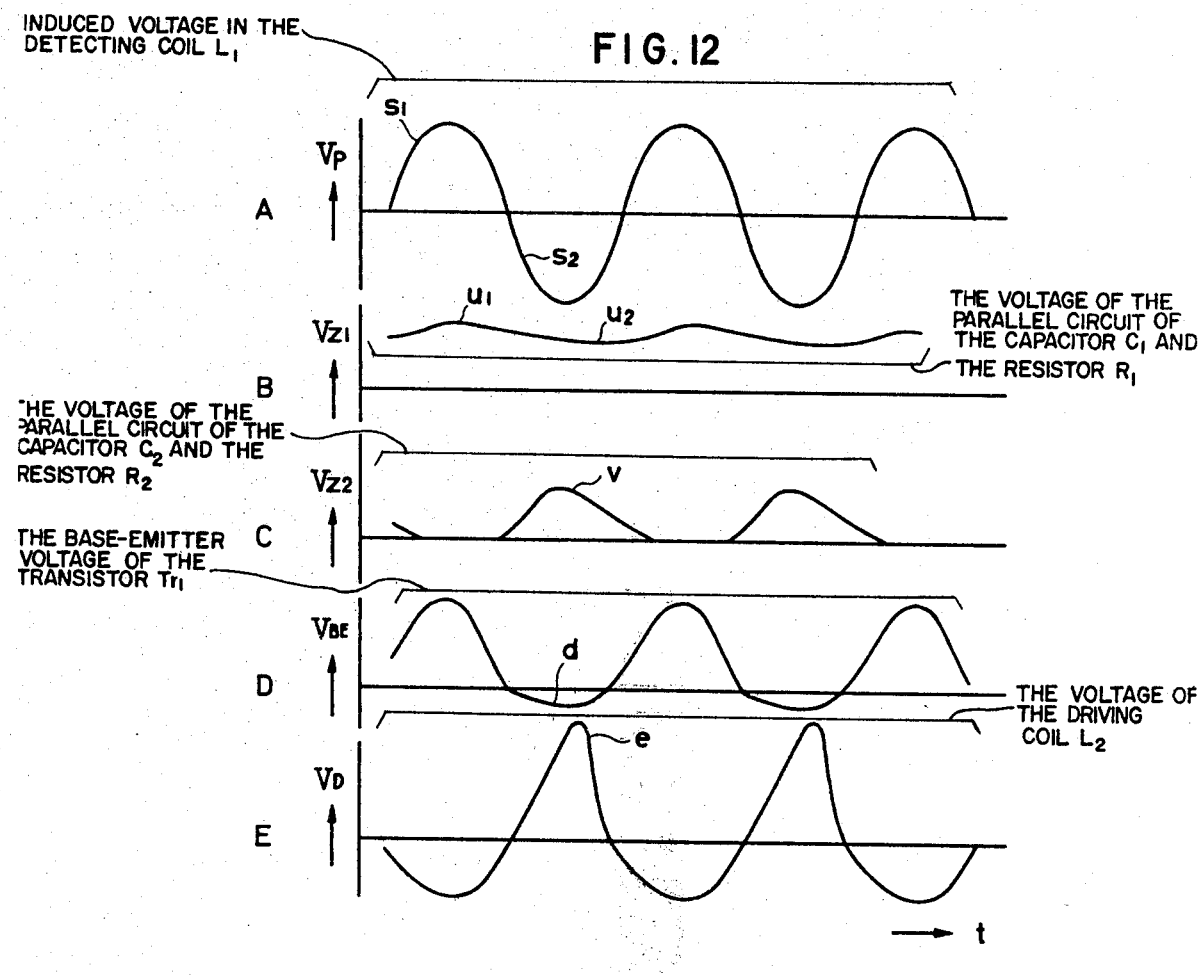

3,919,606

TRANSISTOR DRIVING CIRCUIT FOR MOVABLE ELEMENT

BACKGROUND OF THE INVENTION

The present invention relates to a transistor driving circuit which has a detecting coil and a driving coil which drives a movable element such as a rotor and a vibrator, and more particularly to a driving circuit of this type which is highly stable with a simple circuit.

In prior-art devices which drive a rotor or a vibrator (hereinbelow, generically termed a movable element) by means of a transistor circuit with a detecting coil and a driving coil connected thereto, the number of revolutions or the frequency has generally fluctuated with fluctuations of the supply voltage. In order to prevent the fluctuations, some of the devices have been provided with a constant-voltage circuit. This measure, however, has resulted in a considerably complicated circuit. Besides, due to a mechanical load fluctuation in the movement system, the number of revolutions or the frequency has been prone to fluctuate therewith.

SUMMARY OF THE INVENTION

It is accordingly a first object of the present invention to provide a transistor driving circuit which controls a detecting signal for the movement of a movable element and drives the movable element always stably by means of a simple circuit and through the control action of a charging-and-discharging circuit including a directive amplitude limiter.

A second object of the present invention is to provide a transistor driving circuit for a movable element in which a transistor circuit wherein the charging-and-discharging circuit including the directive amplitude limiter, connected on its input side, synchronized with a synchronizing transistor.

According to one aspect of the invention, there is provided transistor driving circuit having a detecting coil and a driving coil and for driving a movable element formed with magnetic poles, in which a detection voltage induced in the detecting coil with the movement of the movable element is applied to a capacitor through a directive amplitude limiter and is also applied to a transistor, the capacitor is charged during a half cycle of the detection voltage, the transistor circuit is operated by a voltage constituted of the charged voltage, the limiting voltage of the amplitude limiter and the detection voltage, and the capacitor is discharged during the subsequent half cycle.

These and other objects and advantages of the invention will be more apparent upon reference to the following specification, claims and appended drawings.

BRIEF DESCRIPTION OF THE DRAWINGS

FIGS. 12A to 12E are waveforms for illustrating operation of the circuit of FIG. 11.

DESCRIPTION OF THE PREFERRED EMBODIMENTS

Figure 1:
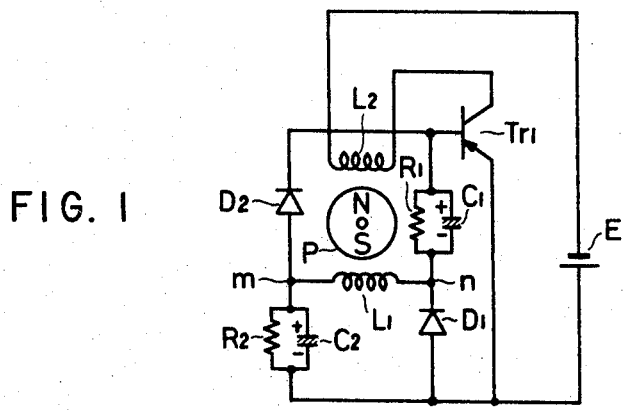
FIG. 1 is an electrical circuit diagram of an embodiment according to the invention.

Referring to FIG. 1, a speed of revolution of a rotor P, formed with magnetic poles N and S at its circumference, is detected by a detecting coil $L_1$. One terminal thereof is connected to the emitter of a transistor $Tr_1$ through a diode $D_1$, and to the base of the transistor $Tr_1$ through a parallel circuit consisting of a resistor $R_1$ and a capacitor $C_1$. The other terminal of the detecting coil $L_1$ is connected to the emitter of the transistor $Tr_1$ through a parallel circuit consisting of a resistor $R_2$ and a capacitor $C_2$, and to the base of the transistor $Tr_1$ through a diode $D_2$. The collector of the transistor $Tr_1$ is connected to the emitter through a driving coil $L_2$ for driving the rotor P and a D.C. power source E.

The operation of the transistor circuit will now be explained with reference to waveform diagrams in FIGS. 2A to 2C. The axes of abscissas in the figures represent the time $t$, while the axis of ordinates in FIG. 2A represents an induced voltage $V_D$ in the detecting coil $L_1$, that in FIG. 2B the base-emitter voltage $V_{BE}$ of the transistor $Tr_1$ and that in FIG. 2C a voltage $V_D$ induced in the driving coil $L_2$.

Figure 2:
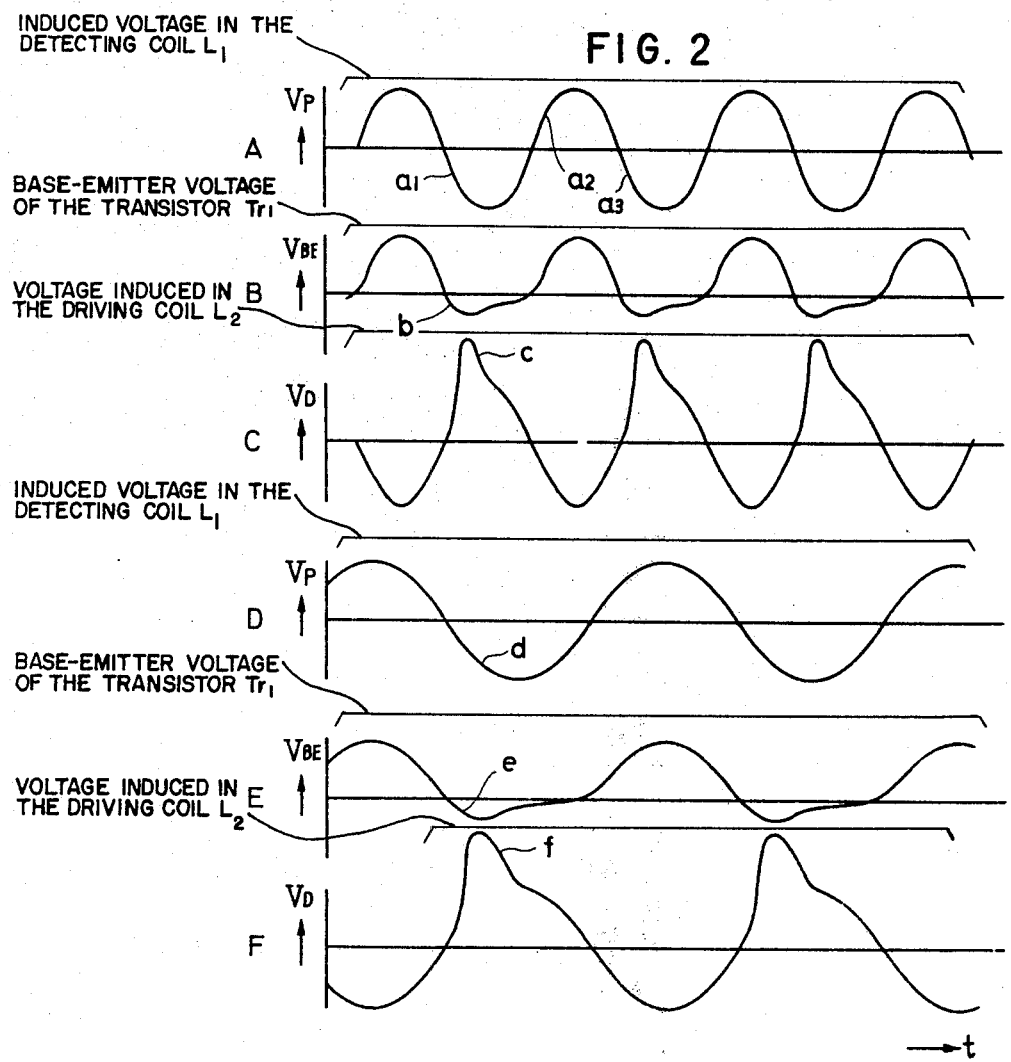
FIGS. 2A to 2F are waveforms for illustrating operation of the circuit of FIG. 1.

When, in the detecting coil $L_1$, the potential of the node $m$ becomes higher than the potential of the node $n$ as in a voltage $a_1$ in FIG. 2A, the diodes $D_1$ and $D_2$ are forward-biased. In the range in which the amplitude of the voltage $a_1$ increases up to the vicinity of the rise voltage of the diodes $D_1$, $D_2$, these diodes $D_1$, $D_2$ exhibit a high resistance as is well known, and so the quantity or level of charging of the capacitors $C_1$, $C_2$ is small. Accordingly, a voltage applied between the base and emitter of the transistor $Tr_1$, namely, the series voltage between the terminal voltages of the diode $D_1$ and the capacitor $C_1$ or between the terminal voltages of the diode $D_2$ and the capacitor $C_2$, is determined substantially by the terminal voltage of the diode $D_1$ or $D_2$. When the voltage of the waveform $a_1$ exceeds the vicinity of the rise voltage of the diodes $D_1$, $D_2$, the resistance of the diodes $D_1$, $D_2$ decreases suddenly, and the charging rate for the capacitors $C_1$, $C_2$ is raised. The charged voltage acts as a reverse bias on the transistor $Tr_1$. The series voltage consisting of the charge voltage of the capacitor $C_1$ and the terminal voltage of the diode $D_1$ shifts the operational state of the transistor towards the cutoff state. In consequence, the voltage applied between the base and emitter of the transistor $Tr_1$ varies as in a waveform $b$ in FIG. 2B. The transistor $Tr_1$ is rendered operative by this voltage, and the voltage induced in the driving coil $L_2$ becomes as in a waveform $c$ in FIG. 2C and rotates the rotor P.

Subsequently, when the induced voltage of the detecting coil $L_1$ has the polarity inverted as in a waveform $a_2$, the charges in the capacitors $C_1$, $C_2$ are respectively discharged through the resistors $R_1$, $R_2$. Further, when the induced voltage becomes as in a waveform $a_3$, the voltage induced in the driving coil $L_2$ functions as the rotating force of the rotor P quite similarly to the foregoing case of the waveform $a_1$.

In the normal operation, the rotor P is rotated as stated above. Where the load increases, the driving force is increased by an operation which will be hereunder described with reference to FIGS. 2D to 2F. Upon the increase of the load, the induced voltage of the detecting coil $L_1$ becomes lower than in the steady state. Since the voltage of the wave form $d$ becomes longer in period, the time in which the voltage reaches the vicinity of the rise voltage of the diodes $D_1$, $D_2$ is longer in comparison with that in the steady state. And so the time in which the capacitors $C_1$, $C_2$ are charged by a current flowing from the emitter to the base of the transistor $Tr_1$, also becomes longer. Therefore, the width of an output driving pulse increases. Since the charging is hardly performed through the diodes $D_1$, $D_2$, the charged voltages of the capacitors $C_1$, $C_2$ are low. Accordingly, the driving output becomes large. When the induced voltage becomes great and the resistances of the diodes $D_1$, $D_2$ lower, then the charged voltages of the capacitors $C_1$, $C_2$ rise and the voltage applied between the base and emitter of the transistor $Tr_1$ decreases. Consequently, the voltage of the driving coil $L_2$ is as shown by a waveform $f$ in FIG. 2F, and the driving force increases as compared with that in the steady state.

Where the load decreases, the driving force decreases by just the reverse operation to the foregoing.

The function is stable against the load fluctuations as stated above, and the description will now be made more in detail in this respect. The voltage V induced in the detecting coil $L_1$ in FIG. 1 is represented by:

$$V = \Phi_{mp} \omega \sin \omega t \quad (1)$$

where $\omega$ denotes the angular velocity of the rotor P and $\Phi_{mp}$ a proportional constant.

Letting $V_F$ be the rise voltage of the diodes $D_1$, $D_2$, and letting $V_{Z1}$ and $V_{Z2}$ be voltage drops in the parallel circuit composed of the capacitor $C_1$ and the resistor $R_1$ and the parallel circuit composed of the capacitor $C_2$ and the resistor $R_2$, respectively, the voltage V is also expressed as follows:

$$V = V_F + V_{Z1} \quad (2)$$

$$V = V_F + V_{Z2} \quad (3)$$

Letting $V_i$ be the input voltage of the transistor $Tr_1$, $$V_i = V - V_{Z1} + V_{Z2}) = 2 V_F - V \quad (4)$$

As apparent from Eq. (4), negative feedback proportional to the speed of revolution is exerted on the input of the transistor $Tr_1$.

On the other hand, a torque T acting on the rotor P is:

$$T = \Phi_m I \sin \omega t \quad (5)$$

where $I$ denotes a current flowing through the driving coil $L_2$ and $\Phi_m$ a proportional constant. It is supposed that the torque T is generated only during the half cycle of the induced voltage.

The characteristic of the transistor $Tr_1$ is approximated as:

$$I \approx a V_i \quad (6)$$

Then, the mean valve W of power supplied to the rotor P is:

$$W = \frac{1}{2\pi} \int_0^\pi T \omega \, d\theta = \frac{2 a V_F \Phi_m \omega}{\pi} - \frac{a \Phi_m \Phi_{mp} \omega^2}{4} \quad (7)$$

Since Eq. (7) does not include the supply voltage, it is seen that the driving circuit is stable against the fluctuations of the supply voltage. The relation between the mean power W (on the axis of ordinates) and the angular velocity $\omega$ (on the axis of abscissas) in Eq. (7) is depicted at a curve $l_1$ in FIG. 4. In the figure, a curve $l_R$ is a load loss curve. The power loss is generally represented by:

$$W_l = (R \omega + F) \omega \quad (8)$$

where R denotes the inertial term of the rotor P and F a frictional force. The point of intersection between the curve $l_R$ and the curve $l_1$ is the operating point at the steady revolution. Here, the coefficient of fluctuation of the angular frequency for changes $\pm \delta$ in the vicinity of the power $W_R$ in the steady state is calculated from Eq. (7) as follows:

$$\left. \frac{d\omega}{dW} \right]_{W_R} \pm \delta = \frac{1}{a} \cdot \frac{1}{2\Phi_m V_F/\pi - \Phi_{mp}\Phi_m\omega/2} \quad (9)$$

Figure 3:
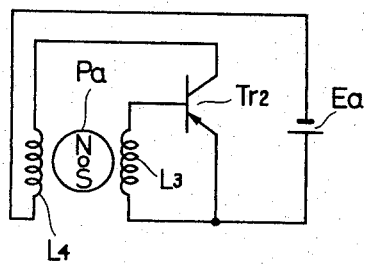
FIG. 3 is a diagram of a prior-art circuit shown for comparison with the circuit according to the present invention.

The same study will now be made on a prior-art driving circuit shown in FIG. 3. In the circuit, a detecting coil $L_3$ is connected between the base and emitter of a transistor $Tr_2$, and a driving coil $L_4$ and a power source $E_a$ are connected between the collector and emitter of the transistor $Tr_2$. A rotor $P_a$ is electromagnetically coupled with the detecting coil $L_3$ as well as the driving coil $L_4$. Likewise to the foregoing, the voltage V induced in the driving coil $L_4$ is:

$$V = \Phi_m \omega \sin \omega t \quad (10)$$

The force acting on the rotor $P_a$ is:

$$F = \Phi_m I \sin \omega t \quad (11)$$

The driving current $I$ of the driving coil $L_4$ is:

$$I = \frac{E - V}{r} \quad (12)$$

where $E$ denotes the value of the applied voltage $E_a$ and $r$ the resistance of the driving coil $L_4$. From Eq. (11), the torque T acting on the rotor P during a half cycle of the induced voltage is:

$$T = \Phi_m \frac{E}{r} \sin \omega t - \Phi_m^2 \frac{\omega}{r} \sin^2 \omega t \quad (13)$$

Accordingly, the mean power $W_p$ fed to the rotor P becomes:

$$W_p = E \Phi_m \omega/\pi r - \Phi_m^2 \omega^2/4r \quad (14)$$

Figure 4:
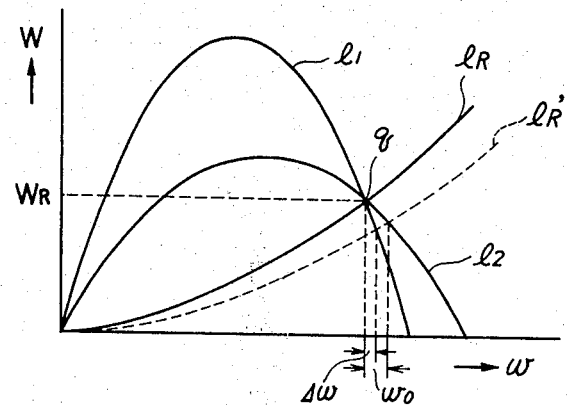
FIG. 4 is a diagram of characteristic curves representative of the relationship between the circuit of the invention and the prior-art circuit.

This is shown as a curve $l_2$ in FIG. 4.

In the vicinity of the intersection point between the curve $l_2$ and the curve $l_R$, the coefficient of fluctuation of the angular velocity for the changes $\pm\delta$ becomes:

$$\left.\frac{d\omega}{dW_p}\right]_{n_R \pm \delta} = r \frac{1}{E \Phi_m/\pi - \Phi_{2m\omega}^2/2} \quad (15)$$

Assuming that the detecting coil $L_1$ and the driving coil $L_2$ in the case of the present invention have the same conditions, then $\Phi_m = \Phi_{mp}$. For the comparison between the circuit of the present invention and the prior-art circuit, it is assumed that $E = 2 V_F$. Then, Eq. (8) and Eq. (15) become as follows, respectively:

$$\left.\frac{d\omega}{dW}\right]_{n_R \pm \delta} = \frac{1}{a} \cdot K, \quad \left.\frac{d\omega}{dW_p}\right]_{n_R \pm \delta} = r \cdot K$$

Here, $$K = \frac{1}{2 \Phi_m V_F/\pi - \Phi_m^2 \omega^2/2} = \frac{1}{E\Phi_m/\pi - \Phi_m^2} \cdot \frac{1}{\omega/2}$$

In general, $1/a < r$, so that:

$$\left.\frac{d\omega}{dW}\right]_{n_R \pm \delta} < \left.\frac{d\omega}{dW_p}\right]_{n_R \pm \delta}$$

As apparent from the characteristic diagram in FIG. 4, where the power point $q$ at the steady revolution fluctuates as shown by a curve $l'_R$, the angular velocity fluntuates by $\Delta\omega$ in the curcuit of the present invention, and in contrast, it fluctuates by $\omega_0 (> \Delta\omega)$ in the prior-art circuit.

Figure 5:
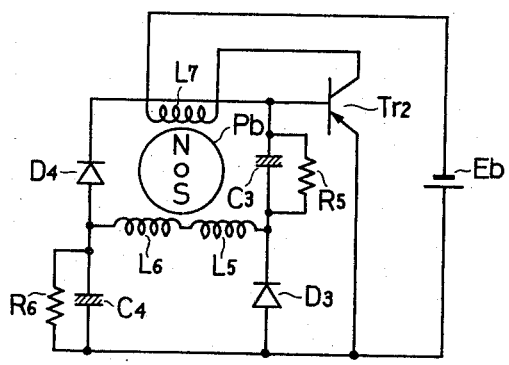
FIG. 5 is a circuit diagram illustrating an experimental circuit of an embodiment according to the present invention.
Figure 6:
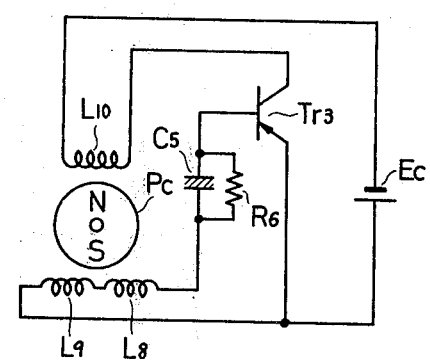
FIG. 6 is a prior-art circuit for comparison with the circuit of FIG. 5.
Figure 7:
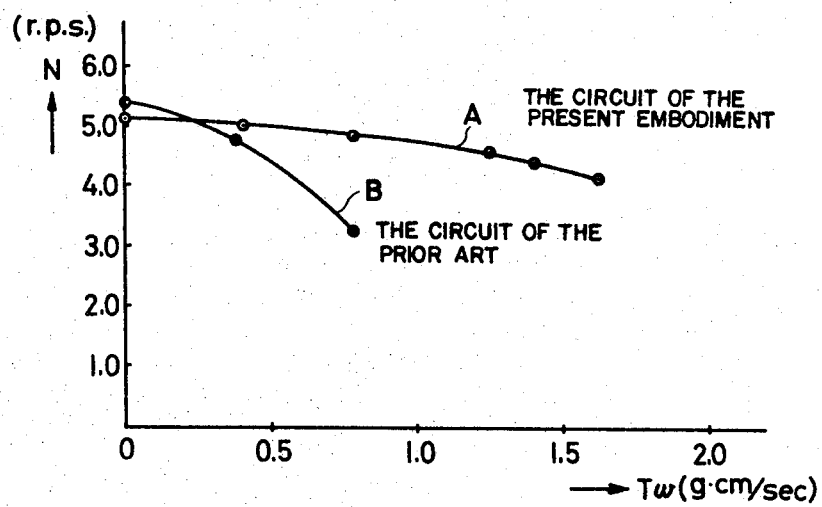
FIG. 7 is a diagram of experimental characteristic curves representative of the relationship between the circuit of FIG. 5 and the prior-art circuit of FIG. 6.

Referring now to FIGS. 5 to 7, there will be explained results in the case where a circuit of an embodiment of the present invention and an example of a prior-art circuit were experimentally compared and studied.

FIG. 5 is a circuit diagram of an embodiment of the present invention, in which series detecting coils $L_5$ and $L_6$ and a driving coil $L_7$ have the same specifications. A resistor $R_5$ has a resistance value of 6.5 KΩ, a resistor $R_6$ has a resistance value of 10 KΩ, a capacitor $C_3$ has a capacitance value of 47 μF, and a capacitor $C_4$ also has the capacitance value of 47 μF. A transistor $Tr_2$ has amplification factor $\beta = 220$, a rotor $P_b$ has six poles, and a D.C. power source $E_b$ has a voltage value of 1.5 V. The diodes $D_3$ and $D_4$ are connected as shown.

FIG. 6 illustrates a prior-art circuit, in which detecting coils $L_8$ and $L_9$ in series and a driving coil $L_{10}$ have the same specifications as in the circuit of FIG. 5. A resistor $R_6$ has a resistance value of 6.5 KΩ, while a capacitor $C_5$ has a capacitance value of 47 μF. A transistor $Tr_3$ is the same type as in the transistor $Tr_2$, a D.C. power source $E_r$ has a voltage value of 1.0 V, and a rotor $P_c$ has six poles and has the same specifications as those of the rotor in FIG. 5.

The characteristics of the number of revolutions (N) of the rotor — versus — the load (Tω) of the respective circuits are shown in FIG. 7. A curve A corresponds to the circuit of the embodiment of the invention in FIG. 5, while a curve B corresponds to the prior-art circuit. As apparent from the characteristic curves, the present invention is stable against load fluctuations.

Figure 8:
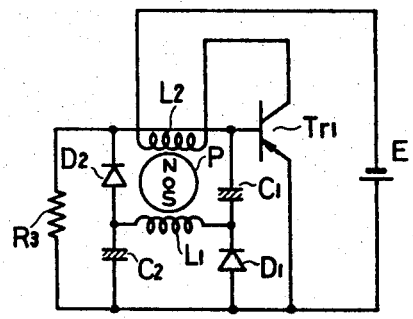
FIGS. 8 to 11 are circuits of different embodiments of the invention.

An embodiment in FIG. 8 is constructed such that a resistor $R_3$ for discharging charges stored in the capacitors $C_1$ and $C_2$ is commonly provided. The same symbols as in FIG. 1 represent elements of the same functions. The operation of this embodiment is substantially the same as in FIG. 1.

Figure 9:
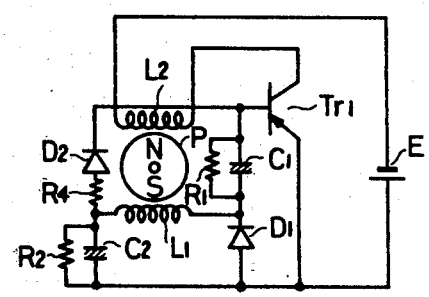

According to another embodiment in FIG. 9, where the rise characteristics of the diodes $D_1$ and $D_2$ are different, a resistor $R_4$ is connected in series with the diode $D_2$. Illustrated is an example in the case where the rise voltage of the diode $D_2$ is lower than that of the diode $D_1$. This embodiment is also substantially the same in operation as the embodiment in FIG. 1.

The same symbols as in FIG. 1 indicate elements in FIG. 9 having the same functions as in FIG. 1.

Figure 10:
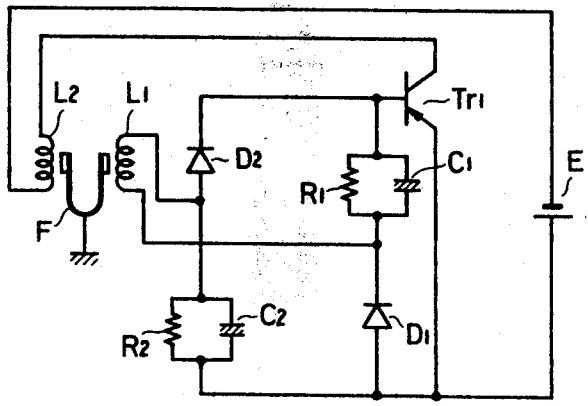

FIG. 10 shows still another embodiment, which is used as a driving circuit for a tuning fork vibrator F in place of the rotor P. It is needless to say that the vibrator is not restricted to the above-mentioned one, but that it may also be a balance-wheel vibrator, a cantilever vibrator or the like vibrator.

The driving circuit itself is that of the embodiment in FIG. 1. In the case of the vibrator, the operation is substantially the same as explained in connection with FIG. 1 except that the induced voltage of the detecting coil $L_1$ is intermittent.

Although, in the foregoing embodiments, the diodes $D_1$ and $D_2$ are explained as to only the function of the amplitude limiter, they serve also to compensate output current changes to which the transistor $Tr_1$ is subjected by temperature changes. The compensation is known, and no detailed explanation is made.

Figure 11:
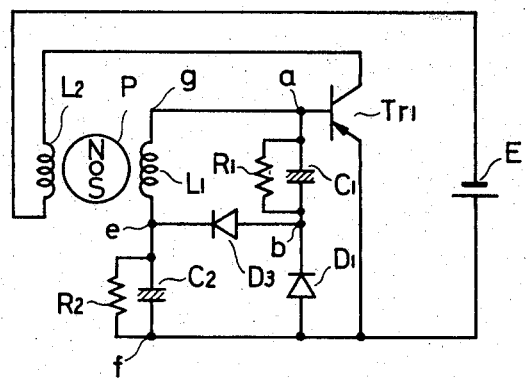

An embodiment in FIG. 11 is a circuit which effects the charging in a half cycle of the voltage of the detecting coil $L_1$ and the driving as well as the discharging in the next half cycle. A difference from the circuit of FIG. 1 is that the detecting coil $L_1$ and the diode $D_2$ are replaced in the connection with each other. Except that the symbol of the diode is made $D_3$, circuit elements of the same symbols as in FIG. 1 have the same functions.

The operation of this embodiment will be described with reference to FIGS. 12A to 12E.

The axes of abscissas in the figures represent the time $t$, while the axis of ordinates in FIG. 12A represents an induced voltage $V_P$ in the detecting coil $L_1$, that in FIG. 12B the voltage $V_{z1}$ of the parallel circuit consisting of the capacitor $C_1$ and the resistor $R_1$, that in FIG. 12C the voltage $V_{z2}$ of the parallel circuit consisting of the capacitor $C_2$ and the resistor $R_2$, that in FIG. 12D the base-emitter voltage $V_{BE}$ of the transistor $Tr_1$, and that in FIG. 12E the voltage of $V_D$ of the driving coil $L_2$. When the voltage induced in the detecting coil $L_1$ by the revolution of the rotor P is such that the potential of a terminal $g$ is higher than the potential of a terminal $e$ as shown by a waveform $S_1$ in FIG. 12a, the diode $D_3$ is forward-biased, and the voltage of the capacitor $C_1$ rises as shown by a waveform $U_1$ in FIG. 12B.

Since, however, the diode $D_1$ is applied with a voltage in the reverse direction, the capacitor $C_2$ is not charged.

Subsequently, when the induced voltage falls into a waveform $S_2$, the diode $D_1$ is forward-biased, and the capacitor $C_2$ is charged. Simultaneously therewith, charges stored in the capacitor $C_1$ are discharged. The voltage of the capacitor $C_1$ at this time becomes a waveform $U_2$, while that of the capacitor $C_2$ varies as in a waveform V.

The base-emitter voltage $V_{BE}$ of the transistor $Tr_1$ varies as in a waveform $d$ due to the waveform $U_2$ of the charged voltage of the capacitor $C_1$, the nonlinear resistance of the diode $D_1$, etc. When the voltage of the waveform $d$ exceeds the trigger level of the transistor $Tr_1$, it is amplified and a driving current flows through the coil $L_2$. The driving voltage has a waveform $e$. In this way, a rotating force is applied on the rotor P.

Figure 13:
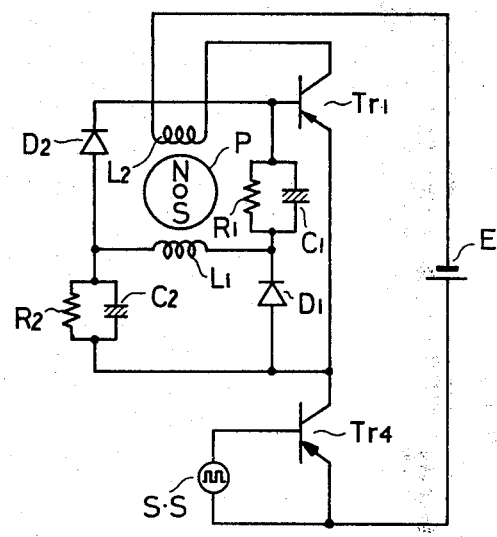
FIG. 13 is a circuit of another embodiment.

FIG. 13 shows an embodiment in the case where the circuit of the present invention is externally synchronized. S.S indicates a synchronizing signal which is obtained, for example, by subjecting the output of a crystal oscillator to a frequency division. A transistor $Tr_1$ has its operation controlled by the synchronizing signal. The same symbols as in FIG. 1 designate elements of the same functions.

In accordance with this circuit, only when the transistors $Tr_1$ and $Tr_4$ operate, a current flows through the driving coil $L_2$, and the rotor P is rotated in synchronism with the synchronizing signal S.S.

As described above in detail, the driving circuit of the present invention controls the input of a transistor by the action of a charging-and-discharging circuit including a directive amplitude limiter, so that it is very stable against load fluctuations. In addition, since it is not directly affected by a supply voltage, it is stable against supply voltage fluctuations. Where a diode is employed as the directive amplitude limiter, the output change of the transistor ascribable to a temperature change is also compensated.

What I claim and desire to secure by Letters Patent is:

1. A transistor driving device for a movable element comprising: a driven movable element having magnetic poles of opposite polarity spaced thereon; a detecting coil for detecting the movement of said movable element with magnetic poles thereon and having a detection voltage induced therein in response to the detection of said movement; a driving coil electromagnetically coupled to said movable element for driving said movable element; a first charging circuit comprising both an amplitude limiter and an impedance comprising a capacitor charged by a half cycle of the detection voltage induced in said detecting coil; a second charging circuit comprising both another amplitude limiter and another impedance comprising another capacitor charged by said half cycle of said detection voltage; a first discharging circuit discharging a stored charge of the capacitor in said first charging circuit during a half cycle succeeding the first-mentioned half cycle; a second discharging circuit discharging a stored charge of the capacitor in said second charging circuit during the second half cycle of said detection voltage; a transistor circuit having an output connected to said driving coil and an input comprising said first charging and discharging circuits and said second charging and discharging circuits; a source of power connected to said driving coil and said input of said transistor circuit.

2. A transistor driving device for a movable element according to claim 1, further including a synchronizing transistor circuit synchronized by an external synchronizing signal and connected for rendering the first-mentioned transistor circuit synchronized with the external synchronizing signal.

3. A transistor driving device for a movable element comprising: a movable element having magnetic poles of opposite polarity spaced thereon; a detecting coil for detecting movement of said movable element with magnetic poles thereon and developing a detection voltage in response to said movement; a driving coil electromagnetically coupled to said movable element for driving said movable element; a transistor having a collector connected to said driving coil; an amplitude limiter and an impedance comprising a capacitor and another impedance comprising another capacitor and another amplitude limiter connecting an emitter of said transistor to the base thereof; and means connecting said detecting coil between two junction points with said impedances and amplitude limiters; and a source of power connected to said driving coil and said emitter of said transistor.

4. A transistor driving device for a movable element according to claim 3, in which each of said impedances consists of a capacitor and a resistor connected in parallel in series circuit with a corresponding amplitude limiter.

5. A transistor driving device for a movable element according to claim 3, further including a synchronizing transistor circuit synchronized with an external synchronizing signal connected rendering the first-mentioned transistor synchronized with said external synchronizing signal.

6. A transistor driving device for a movable element according to claim 5, further including a resistor connected in series with one of said amplitude limiters.

7. A transistor driving device for a movable element according to claim 5, further including a resistor connected in series with both of said amplitude limiters.

8. A transistor driving device for a movable element comprising: a movable element having magnetic poles of opposite polarity spaced thereon; a detecting coil which detects movement of said movable element with magnetic poles thereon for developing a detection voltage in response to the movement detected; a driving coil electromagnetically coupled to said movable element for driving said movable element; a transistor having a collector connected to said driving coil; an amplitude limiter and an impedance comprising a capacitor connecting an emitter of said transistor to a base thereof, and another impedance comprising another capacitor and said detecting coil connecting said emitter to the base; another amplitude limiter connected between a junction point of said impedance and amplitude limiter and a junction point of said another impedance and said detecting coil; and a source of power connected to said driving coil and said emitter.

* * * * *